(12) United States Patent
Lajoie

(10) Patent No.: US 9,585,370 B2
(45) Date of Patent: *Mar. 7, 2017

(54) HARNESS FOR PET AND METHODS OF USE

(71) Applicant: Darius S. Lajoie, Cumming, GA (US)

(72) Inventor: Darius S. Lajoie, Cumming, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/149,954

(22) Filed: May 9, 2016

(65) Prior Publication Data
US 2016/0249588 A1 Sep. 1, 2016

Related U.S. Application Data

(63) Continuation-in-part of application No. 14/455,046, filed on Aug. 8, 2014, now Pat. No. 9,357,751.

(51) Int. Cl.
A01K 27/00 (2006.01)

(52) U.S. Cl.
CPC .......... A01K 27/002 (2013.01); A01K 27/005 (2013.01)

(58) Field of Classification Search
CPC .... A01K 27/00; A01K 27/001; A01K 27/002; E05B 75/00
See application file for complete search history.

(56) References Cited

U.S. PATENT DOCUMENTS

| | | | | | |
|---|---|---|---|---|---|
| 1,085,954 | A | * | 2/1914 | Townsend | A01K 15/02 119/712 |
| 1,199,100 | A | * | 9/1916 | Murphy | E05B 75/00 70/17 |
| 1,359,905 | A | * | 11/1920 | Molyneux | A01K 1/0613 119/801 |
| 1,531,052 | A | * | 3/1925 | Tuff | A01K 15/003 119/801 |
| 1,856,427 | A | * | 5/1932 | Pratt | E05B 75/00 70/16 |
| 2,324,183 | A | * | 7/1943 | Wilson | E05B 75/00 2/300 |
| 3,967,343 | A | * | 7/1976 | Westervelt | A22B 7/001 119/815 |
| 4,498,425 | A | * | 2/1985 | Aanestad | A01K 1/0613 119/729 |
| 4,782,791 | A | * | 11/1988 | Brock | A01K 1/0613 119/732 |
| 8,769,998 | B1 | * | 7/2014 | MacConnell | E05B 75/00 70/16 |
| 9,089,109 | B2 | * | 7/2015 | Codos | A01K 27/002 |
| 2005/0145202 | A1 | * | 7/2005 | Bonner | A01K 27/003 119/792 |
| 2012/0102675 | A1 | * | 5/2012 | Lee | G06F 1/1681 16/243 |

* cited by examiner

Primary Examiner — Monica Williams
Assistant Examiner — Aaron Rodziwicz
(74) Attorney, Agent, or Firm — Mathew L. Grell; Grell & Watson Patent Attorneys

(57) ABSTRACT

A animal restraint harness having a two part pivotable frame having a set of fingers or arms extended therefrom to encircle or saddle an animal body, a spring hinge to force the fingers together, tabs or opening handles to separate the fingers, one or more harness straps, and a leash clip positioned thereon the frame and, thus such harness enables a single person to quickly and/or efficiently place the harness assembly on the animal using one hand and such harness enables safe restraint of the animal without causing the animal to choke or wheeze.

18 Claims, 13 Drawing Sheets

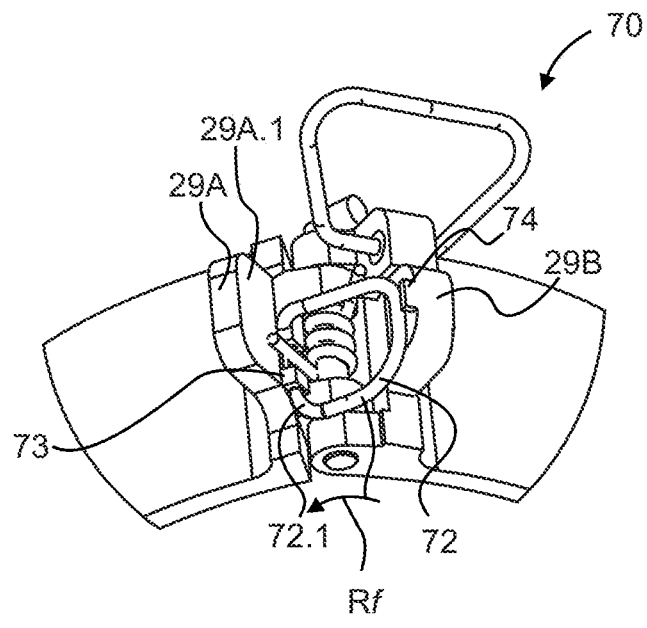
Fig. 8A
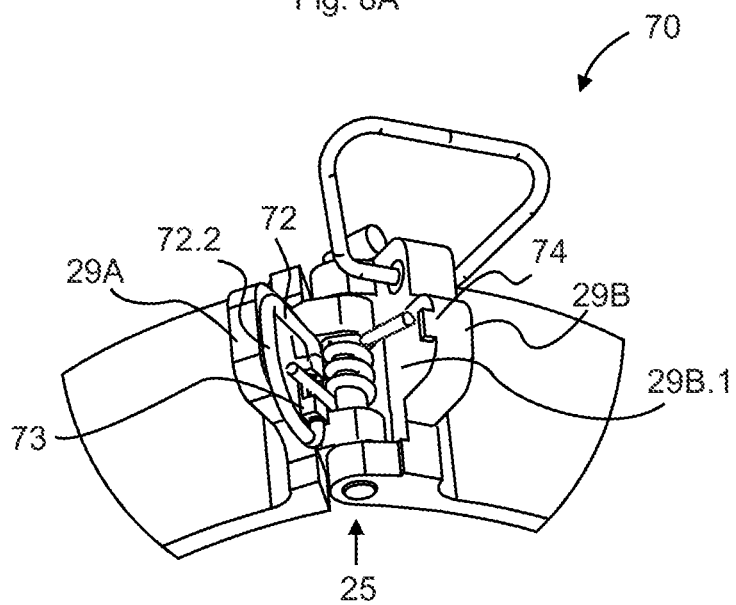
Fig. 8B
Fig. 8

HARNESS FOR PET AND METHODS OF USE

CROSS-REFERENCE TO RELATED APPLICATIONS

To the full extent permitted by law, the present United States Non-provisional patent application, is a Continuation, and hereby claims priority to and the full benefit of United States Non-provisional application entitled "Harness for Animals and Methods of Use," having assigned Ser. No. 14/455,046, filed on Aug. 8, 2014, incorporated herein by reference in its entirety.

TECHNICAL FIELD

The disclosure relates generally to a harness for attaching a leash to an animal and more specifically it relates to a body worn harness that encircles the animal's body and is non-choking.

BACKGROUND

Various animal harnesses or breast collars are known in the prior art, such restraints include attaching a leash to a neck collar, choke chain, or slip type collar that encircles the animal's neck. Another approach is to attach a leash to a harness that encircles the animal's neck and body behind the front legs. Such restraint devices are assembled by joining together portions of leather or nylon straps fastened together by sewing, rivets, hook and loop, clasps, rings or clips. Moreover, these animal harnesses are built with different dimensions to accommodate animals of different size, and generally comprise systems for enclosing the animal within the harness and adjusting the length of the straps for properly fitting the harness to a given animal. Harnesses that encircle the animal's neck and body are cumbersome due to an array of complicated straps and buckles that have to be attached in various places including underneath the animal. Such assemblies take too much time to install on a domestic animal each time you want to take the animal outside. Due to the time allotments for harnesses that encircle the animal's neck and body most domestic animals have a neck collar. However, neck collars have their own short comings, such as when tugged to restrain the animal this may cause injury to the animal' wind pipe by putting pressure on the animal's neck and airway making it difficult to breathe. Additionally, the leash ring on neck collars is often positioned downward under the animal's neck making it difficult to locate and attach the leash.

Therefore, it is readily apparent that there is a recognized unmet need for a harness for animals and methods of use, wherein such apparatus may be quickly placed on the animal with one hand and safely enables restraint of the animal without causing the animal to choke or wheeze.

BRIEF SUMMARY

Briefly described, in an example embodiment, the present apparatus and method overcomes the above-mentioned disadvantage, and meets the recognized need for a harness for animals and methods of use comprising, in general, a two part pivotable frame having a set of fingers or arms extended therefrom to encircle or saddle an animal body, a spring hinge to force the fingers together, tabs or opening handles to separate the fingers, one or more harness straps, and a leash clip positioned thereon the frame and, thus such apparatus enables a single person to quickly and/or efficiently place the harness assembly on the animal using one hand and such apparatus enables safe restraint of the animal without causing the animal to choke or wheeze.

According to its major aspects and broadly stated, the harness for animals and methods of use comprising, in general, a two part frame having a set of fingers or arms to encircle or saddle an animal body, a spring hinge to force the fingers together, tabs or opening handles to separate the fingers, a breast collar strap having a first side connected to a first finger and the other side connected to a second finger, and ridge strap connected to the frame, the straps further converge to a leash clip positioned behind the frame.

In a preferred embodiment, a harness for animals and methods of use, the apparatus a harness to releasably restrain an animal, including a pivotable frame, the pivotable frame having a first frame member and a second frame member hingedly attached to one another, the first frame member configured having at least one first finger and a first opening handle and the second frame member frame configured having at least one second finger and a second opening handle, a spring connected to each of the first frame member and the second frame member, the spring biases the at least one first finger and the at least one second finger together, and at least one harness strap affixed to the pivotable frame.

In still a further exemplary embodiment of the method of restraining an animal, the method comprising the steps of providing a harness having a pivotable frame, the pivotable frame having a first frame member and a second frame member hingedly attached to one another, the first frame member configured having at least one first finger and a first opening handle and the second frame member frame configured having at least one second finger and a second opening handle, a spring connected to each of the first frame member and the second frame member, the spring biases the at least one first finger and the at least one second finger together, at least one harness strap affixed to the pivotable frame; and a leash ring attached to the at least one harness strap, attaching a leash thereto the leash ring, gripping the first opening handle and the second opening handle, opening the at least one first finger and the at least one second finger, positioning the animal between the at least one first finger and the at least one second finger, releasing grip on the first opening handle and the second opening handle, closing the at least one first finger and the at least one second finger, and restraining the animal therein the harness.

Accordingly, a feature of the harness for animals and methods of use is its ability to enable a single person to quickly and/or efficiently place the harness assembly on the animal using one hand.

Another feature of the harness for animals and methods of use is its ability to safely tug on the leash and restrain the animal without causing injury to the animal's wind pipe by putting pressure on the animal's neck and airway making it difficult to breathe or cause the animal to choke or wheeze.

Still another feature of the harness for animals and methods of use is its ability to alleviate the hunt and search for leash ring to connect the leash especially since the ring on neck collars is often positioned downward under the animal's neck making it difficult to locate and attach the leash.

Yet another feature of the harness for animals and methods of use is its ability to provide a compact, one hand operable, and portable harness and leash assembly ready for quick and/or efficient placement over the animals head and/or body.

Yet another feature of the harness for animals and methods of use is its ability to be quickly and/or efficiently placed on a moving animal.

Yet another feature of the harness for animals and methods of use is its ability to be adjustable in size to accommodate different sized animals and expand to accommodate animal growth.

Yet another feature of the harness for animals and methods of use is its ability to have adjustable finger lengths to accommodate different sized animals and expand to accommodate animal growth.

Yet another feature of the harness for animals and methods of use is its ability to have an adjustable breast collar strap to accommodate different sized animals and expand to accommodate animal growth.

Yet another feature of the harness for animals and methods of use is its ability to have a breast collar strap that slides within the set of fingers to quickly and/or efficiently place the harness assembly on the animal using one hand.

Yet another feature of the harness for animals and methods of use is its ability to have the fingers biased in a normally closed position.

Yet another feature of the harness for animals and methods of use is its ability to have the fingers biased in a normally open position.

Yet another feature of the harness for animals and methods of use is its ability to be utilized with existing leashes.

Yet another feature of the harness for animals and methods of use is its ability to be easier, and simpler to use than existing technology.

Yet another feature of the harness for animals and methods of use is its ability to provide a design that does not place any pressure on the animal's neck.

Yet another feature of the harness for animals and methods of use is its ability to provide a design that encompasses the animal's back, rib cage, and chest as one unit.

Yet another feature of the harness for animals and methods of use is its ability to provide a compact, collapsible, and portable harness assembly that is easily stored and transported.

Yet another feature of the harness for animals and methods of use is its ability to automatically expand to accommodate animal growth.

Yet another feature of the harness for animals and methods of use is its ability to provide a light weight apparatus that is operable with one hand installation.

These and other features of the harness for animals and methods of use will become more apparent to one skilled in the art from the following Detailed Description of the Embodiments and Claims when read in light of the accompanying drawing Figures.

BRIEF DESCRIPTION OF THE DRAWINGS

The present harness for animals and methods of use will be better understood by reading the Detailed Description of the embodiments with reference to the accompanying drawing figures, in which like reference numerals denote similar structure and refer to like elements throughout, and in which:

FIG. 8A is a top front facing close-up perspective view of an alternate embodiment of the animal harness assembly of FIG. 1, shown with a locking mechanism in a closed position;

FIG. 8B is a top front facing close-up perspective view of an alternate embodiment of the animal harness assembly of FIG. 1, shown with a locking mechanism in an open position;

FIG. 9A is an exploded side front facing perspective view of an alternate embodiment of the animal harness assembly of FIG. 1, shown with overlapping size adjustable fingers;

FIG. 9B is a exploded top front facing perspective view of an alternate embodiment of the animal harness assembly of FIG. 1, shown with side-by-side size adjustable fingers;

Figure 1:
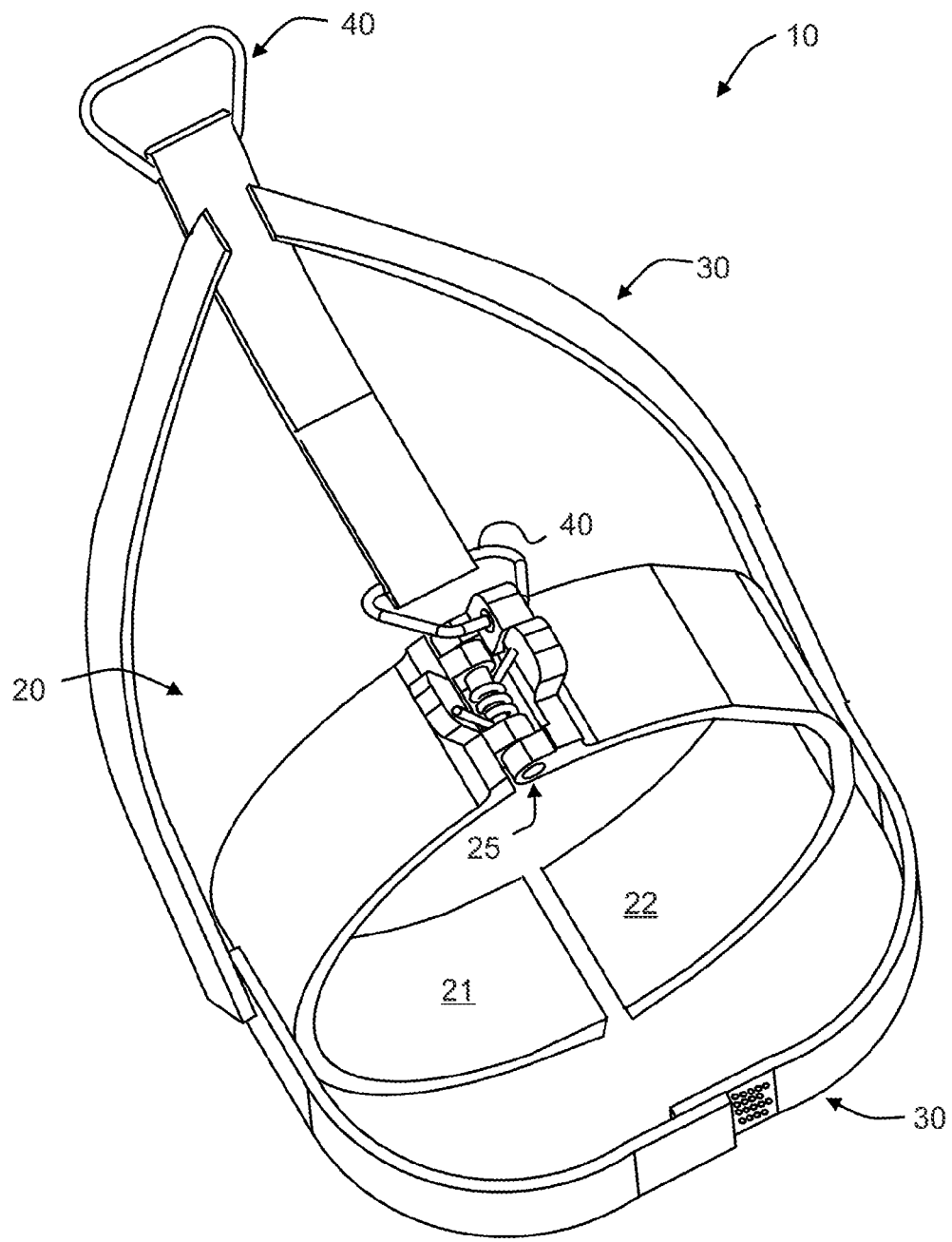
FIG. 1 is a top perspective view of an example embodiment of an animal harness assembly.
Figure 2:
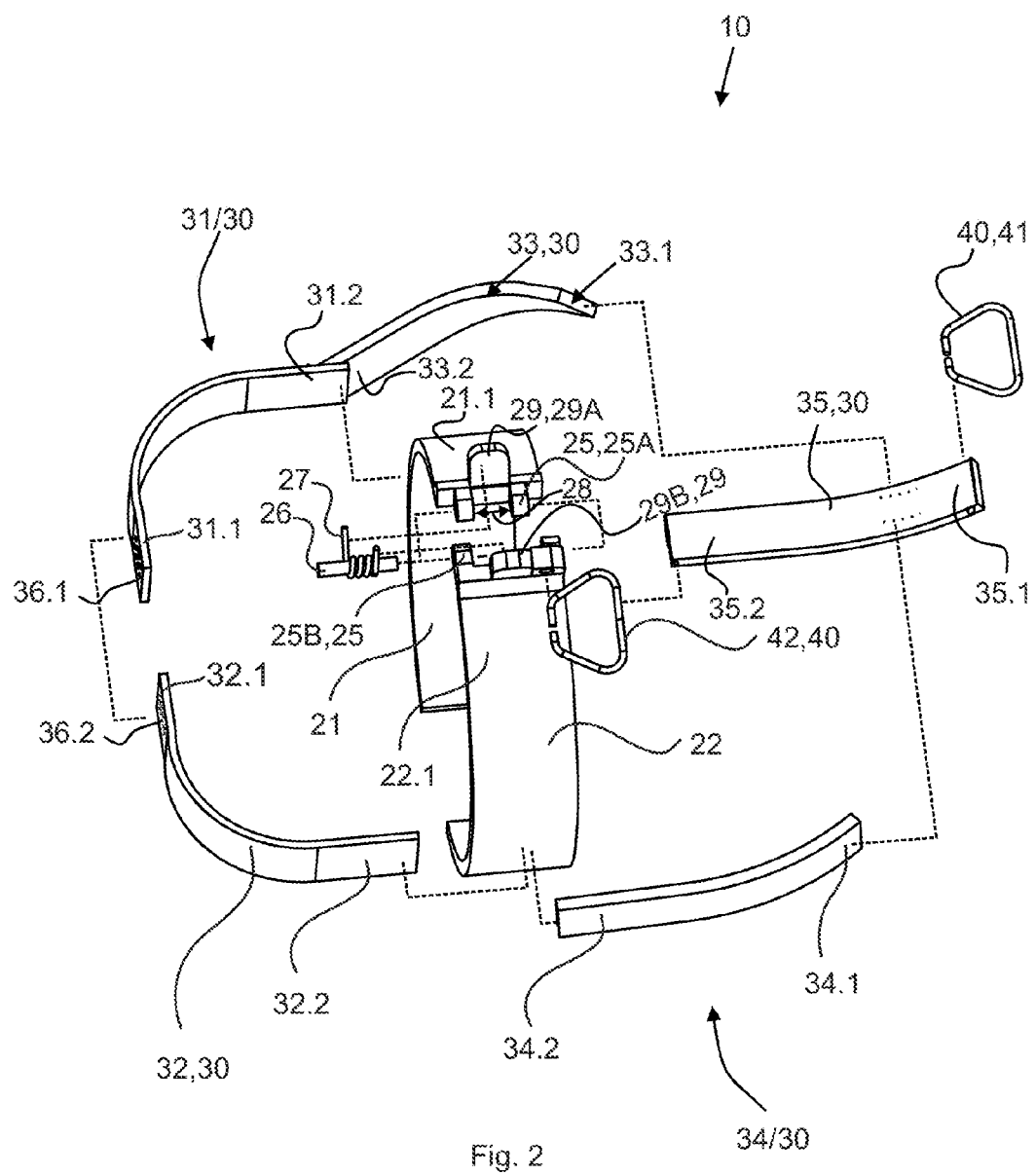
FIG. 2 is an exploded top perspective view of the animal harness assembly of FIG. 1.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-13 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-4, by way of example, and not limitation, there is illustrated exemplary embodiment of animal harness assembly, such as harness assembly 10. Preferably, harness assembly 10 includes pivotable frame 20, harness strap(s) 30, and leash ring 40. Preferably pivotable frame 20 includes a set or two part frame, jaw, or clam shell configuration, such as first frame member 21 and second frame member 22, each frame member having at least one elongated arms or half saddle members extended therefrom to encircle an animal's body or torso therein, such as one or more sets of fingers, including first finger 21 and second finger 22, and a hinge, rotatable coupler or spring hinge, such as hinge coupler 25. Hinge coupler 25 preferably may be utilized to removeably affix hingedly affix first frame member 21 thereto second frame member 22. First finger 21 and second finger 22 may be configured in an arcing or curved configuration whereby when rotated thereabout hinge coupler 25 this facilitates rotational opening of first finger 21 and second finger 22 of pivotable frame 20 to then encompass an animal's body or torso and rotational closure of first finger 21 and second finger 22 of pivotable frame 20 to grip or enclose an animal's body or torso.

It is recognized herein that one or more sets of fingers 21-24 may further incorporate a padded section or padded sets of fingers. It is further recognized herein that one or more sets of fingers 21-24 may be removable or detachable or interchangeable to enable replacement of one or more sets of fingers 21-24 to accommodate animal growth.

Pivotable frame 20 is preferably formed of a suitable material or fabric, such as plastic, rubber, vinyl, polyurethane, fiber, reinforced or coated canvas, wire, coated wire, coated fiber or mesh, nylon, metal, shape memory metal, steel, sprung steel, padded or unpadded or the like, capable of providing structure and comfort to pivotable frame 20. Preferably, the material includes other suitable characteristics, such as rigidity, semi-flexibility, durability, strength, water resistant, puncture resistant, tear resistant, light weight, chemical inertness, oxidation resistance, ease of workability, or other beneficial characteristic understood by one skilled in the art.

It is contemplated herein that pivotable frame 20 may include sprung steel or other like material and be configured as normally closed first finger 21 and second finger 22 or biasing first finger 21 and second finger 22 together.

Referring again to FIG. 2, by way of example, and not limitation, there is illustrated an exploded view of harness assembly 10. Preferably hinge coupler 25 may include first hinge coupler 25A disposed on a first end 21.1 of first frame member or first finger 21 and second hinge coupler 25B disposed on a first end 22.1 of second frame member or second finger 22. It is recognized herein that first frame member 21 and second frame member 22 may be are hingedly attached to one another. Furthermore, first hinge coupler 25A is preferably offset from second hinge coupler 25B to form gap 28 and first hinge coupler 25A may be further positioned proximate second hinge coupler 25B preferably in an end to end or an in-line configuration to enable an attachment device, such as pin 26 to be slidably inserted therein first hinge coupler 25A and second hinge coupler 25B to form rotationally couple of first end 21.1 of first finger 21 and first end 22.1 of second hinge coupler 25B there together. It is recognized herein that first hinge coupler 25A, second hinge coupler 25B, and pin 26 are preferably configured to facilitate rotational opening of first finger 21 and second finger 22 of pivotable frame 20 to encompass an animal's body or torso and rotational closure of first finger 21 and second finger 22 of pivotable frame 20 to grip or enclose an animal's body or torso. It is further recognized herein that hinge coupler 25 may otherwise be configured by one of ordinary skill in the art and may be configured, for example, to snap first hinge coupler 25A and second hinge coupler 25B together. Moreover, first end 21.1 of first finger 21 may include one or more hand or finger grips or tabs, such as one or more opening handles 29, including first finger tab or first opening handle 29A disposed on first end 21.1 of first frame member 21 or first finger 21 and second finger tab or second opening handle 29B disposed on first end 22.1 of second frame member 21 or second finger 22. It is recognized herein that opening handles 29 may be hand gripped or finger pinched to facilitate rotational opening of first finger 21 and second finger 22 of pivotable frame 20 to encompass an animal's body or torso and rotational closure of first finger 21 and second finger 22 of pivotable frame 20 to grip or enclose an animal's body or torso. Still furthermore, a biasing element or torsion spring, such as spring 27 may be positioned in gap 28 when pin 26 is preferably slidably inserted therein first hinge coupler 25A, spring 27 wrapped therearound pin 26, and second hinge coupler 25B to provide rotational biasing thereto pivotable frame 20 either maintaining pivotable frame 20 in a normally closed or normally open position. It is preferably recognized herein that spring 27 preferably maintains pivotable frame 20 in a normally closed position, wherein spring 27 biases first frame member or first finger 21 and second frame member or second finger 22 toward each other. It is further recognized herein that spring 27 may otherwise be configured by one of ordinary skill in the art and may be configured, for example, as a bent piece of sprung metal and positioned therein gap 28 between first hinge coupler 25A and second hinge coupler 25B to provide rotational biasing thereto pivotable frame 20.

It is contemplated herein that biasing element, such spring 27 may include curved or arcing configuration of sprung steel or other like material positioned on outer surface of first finger 21 and second finger 22 of pivotable frame 20 and configured as normally closed.

It is further contemplated herein that biasing element, such spring 27 may include a variable tension spring capable of adjustment of spring force or rotational force Rf to enable varying grip force or grip strength of one or more fingers, such as first finger 21 and second finger 22 during close C.

It is further contemplated herein that one or more opening handles 29 may include hand grips 29 or finger tabs 29.

Figure 3:
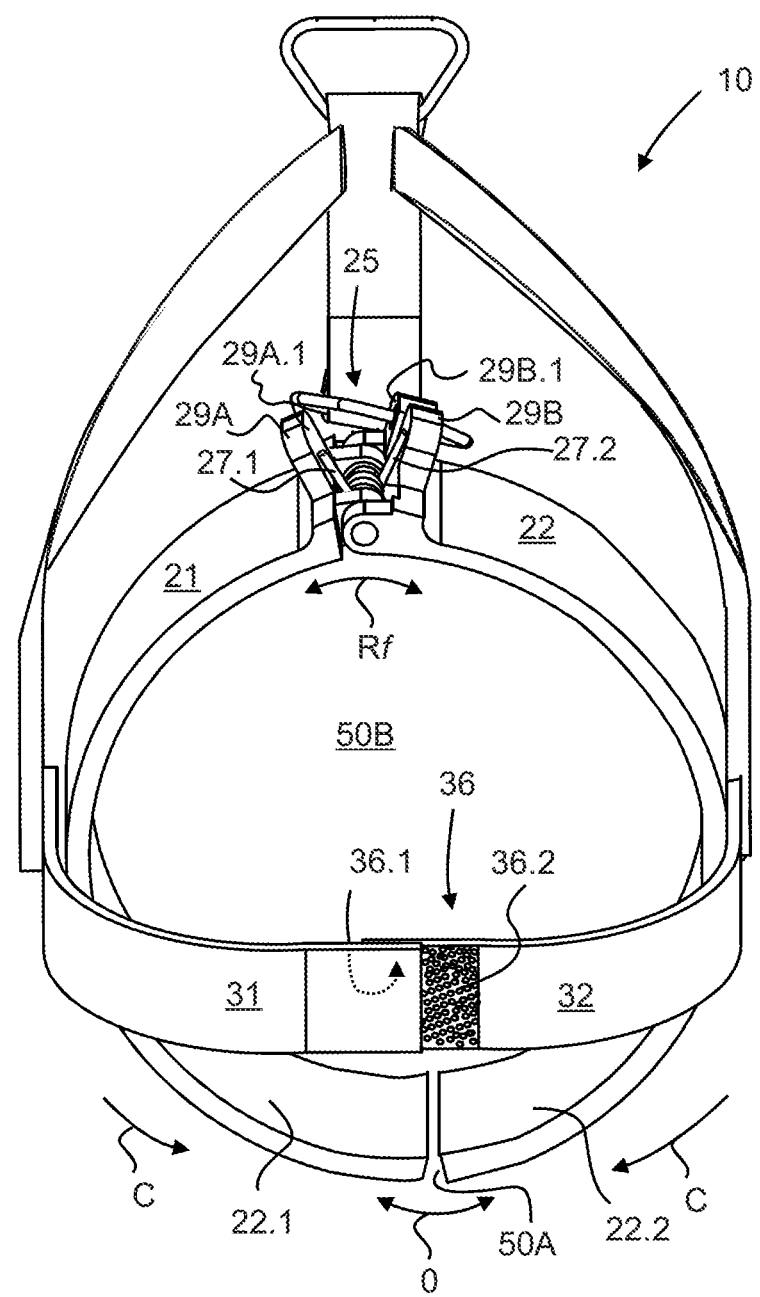
FIG. 3 is a front perspective view of the animal harness assembly of FIG. 1.
Figure 4:
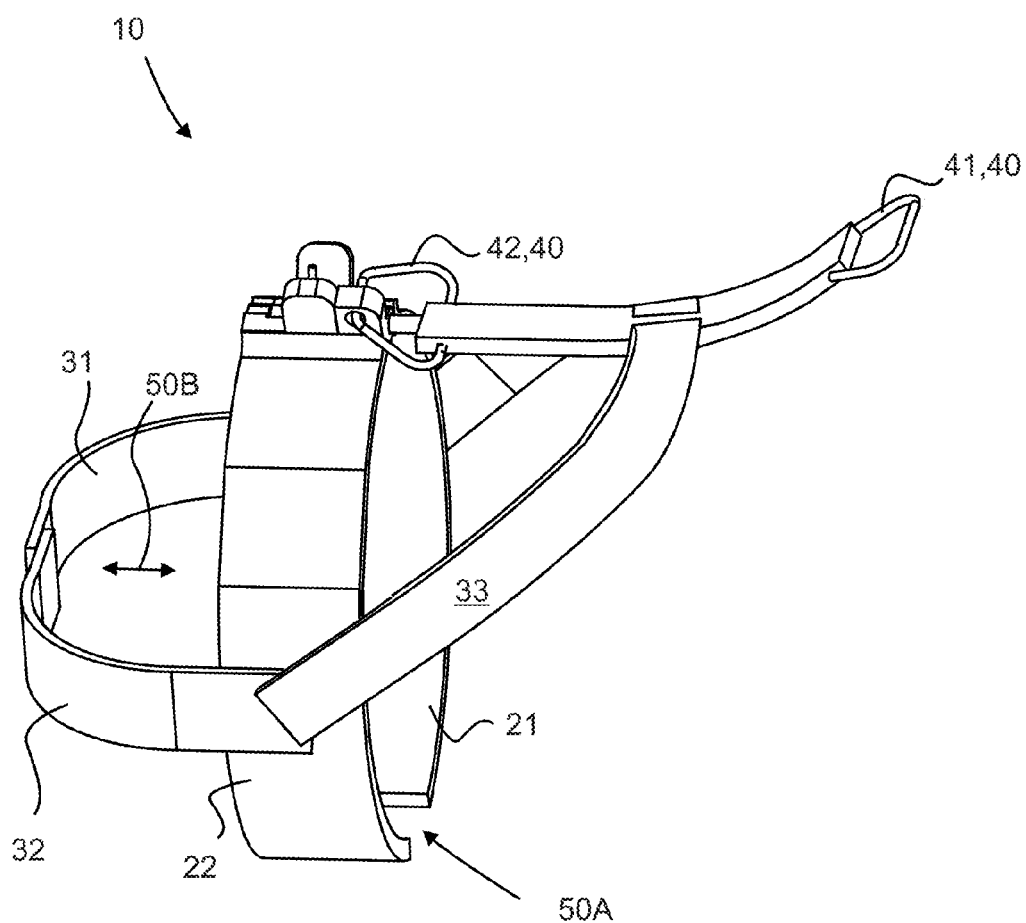
FIG. 4 is a side perspective view of the animal harness assembly of FIG. 1.

Preferably, harness assembly 10 includes one or more flexible supports, such as harness strap(s) 30. Harness strap(s) 30 may include at least one or one or more breast straps 31/32, such as first breast strap 31 and second breast strap 32. Furthermore, first breast strap 31 may include first breast strap end 31.1 and second breast strap end 31.2 wherein second breast strap end 31.2 may be affixed or removably affixed thereto first finger 21 of pivotable frame 20. Still furthermore, second breast strap 32 may include first end 32.1 and second end 32.2 wherein second end 32.2 may be affixed or removably affixed thereto second finger 22 of pivotable frame 20. It is contemplated herein that first breast strap end 31.1 of first breast strap 31 may be removably affixed or removably affixed to first end 32.1 of second breast strap 32, via hook 36.1 and loop 36.2 as shown in FIGS. 1, 3 & 4, or any other expansion device 36, such as sewn, snap, button, clasp, buckle, magnetic device or the like.

It is recognized herein that one or more breast straps 31/32, such as first breast strap 31 and second breast strap 32 may be a single breast strap 31/32 having first end 31/32.1 and second end 31/32.2 wherein first end 31/32.1 may be affixed or removably affixed thereto first finger 21 of pivotable frame 20 and second end 31/32.2 may be affixed or removably affixed thereto second finger 22 of pivotable frame 20.

Furthermore, harness strap(s) 30 may include at least one or one or more torso straps 33/34, such as first torso strap 33 and second torso strap 34. Furthermore, first torso strap 33 may include first torso strap end 33.1 and second torso strap end 33.2 wherein second torso strap end 33.2 may be affixed or removably affixed thereto first finger 21 of pivotable frame 20. Still furthermore, second torso strap 32 may include first torso strap end 34.1 and second torso strap end 34.2 wherein second torso strap end 34.2 may be affixed or removably affixed thereto second finger 22 of pivotable frame 20. It is recognized herein that second torso strap end 33.2 of first torso strap 33 and second torso strap end 34.2 of second torso strap 34 may be affixed one to the other, or affixed to leash ring 41.

It is recognized herein that one or more harness strap(s) may be configured to enable linear length adjustment device, such as a buckle 36 or the like to accommodate size differences and/or volume of to accommodate different sized head H, back Bk, torso T of dog D utilizing.

Harness strap(s) 30 are preferably formed of a suitable material or fabric, such as canvas, plastic, rubber, vinyl, polyurethane, fiber, wire, coated wire, coated fiber or mesh, nylon, Tyvek, elastic, spandex, stretch material or the like, capable of providing structure to harness strap(s) 30. Preferably, the material includes other suitable characteristics, such as flexibility, durability, strength, water resistant, puncture resistant, tear resistant, light weight, heat-resistance, chemical inertness, oxidation resistance, ease of workability, or other beneficial characteristic understood by one skilled in the art.

It is further contemplated herein that sling 11 may be configured and/or sized to accommodate various sized patients P to be secured therein.

It is contemplated herein that one or more leash ring(s) 40, such as leash ring 41 may be affixed or removably affixed thereto harness strap(s) 30 and/or leash ring 42 may be affixed or removably affixed thereto pivotable frame 20.

Furthermore, harness strap(s) 30 may include at least one or one or more ridge strap(s) 35. Furthermore, ridge straps 35 may include first ridge strap end 35.1 and second ridge strap end 35.2 wherein second ridge strap end 35.2 may be affixed or removably affixed thereto leash ring 41 of pivotable frame 20. Still furthermore, first ridge strap end 35.1 may be affixed or removably affixed thereto leash ring 41.

It is contemplated herein that first torso strap end 33.1 of first torso strap 33 and first torso strap end 34.1 of second torso strap 34 may be affixed or removably affixed to first ridge strap end 35.1 of ridge straps 35, as shown in FIGS. 1, 3 & 4, or any other attachment device, such as leash ring 40, snap, button, clasp, buckle, magnetic device, or the like.

It is recognized herein that one or more torso straps 33/34, such as first torso strap 33 and second torso strap 34 may be a single torso strap 33/34 having first end 33/34.1 and second end 33/34.2 wherein first end 33/34.1 may be affixed or removably affixed thereto first finger 21 of pivotable frame 20 and second end 33/34.2 may be affixed or removably affixed thereto second finger 22 of pivotable frame 20.

It is still further recognized herein that one or more breast straps 31/32 and one or more torso straps 33/34 may be a single harness strap(s) 30 affixed or removeably affixed thereto first finger 21 and second finger 22, respectively, of pivotable frame 20.

Referring again to FIG. 3, by way of example, and not limitation, there is illustrated a front perspective view of harness assembly 10. Preferably first opening handle 29A and second opening handle 29B may be configured at approximately ninety-degrees or other angle proximate ninety-degrees to first end 21.1 of first finger 21 and first end 22.1 of second finger 22, respectively. It is recognized that spring ends of spring 27, such as first spring end 27.1 and second spring end 27.2 may be positioned against back side 29A.1 of first opening handle 29A and back side 29B.1 of second opening handle 29B, respectively. Preferably spring 27 applies rotational force Rf to separate first opening handle 29A and second opening handle 29B and, thus rotational force Rf applied against hinge coupler 25 additionally forces or brings second end 21.2 of first finger 21 and second end 22.2 of second finger 22 together and/or in contact with one another. It is recognized herein that counter force against rotational force Rf applied against hinge coupler 25 additionally forces or separates second end 21.2 of first finger 21 from second end 22.2 of second finger 22 of pivotable frame 20 in the direction of open O to enable an animal to be positioned in gap or opening, such as torso opening 50A and rotational force Rf of spring 27 applied against hinge coupler 25 additionally forces or brings second end 21.2 of first finger 21 from second end 22.2 of second finger 22 of pivotable frame 20 in the direction of closed to grip an animal positioned in torso opening 50A. Moreover, first breast strap 31 and second breast strap 32 may be removeably affixed via hook 36.1 and loop 36.2, to itself.

It is recognized herein that expansion device 36 may accommodate size differences and/or volume of to accommodate different sized head H, back Bk, torso T of dog D.

Referring again to FIG. 4, by way of example, and not limitation, there is illustrated a side perspective view of harness assembly 10. Preferably, first finger 21 and second finger 22 of pivotable frame 20, and first breast strap 31 and second breast strap 32 are configured to create a gap or opening, such as head opening 50B where a user of harness assembly 10 may pass through an animal's head, such as dog D.

Referring again to FIG. 5, by way of example, and not limitation, there is illustrated a side perspective view of harness assembly 10 affixed to leash Le. Preferably, in use, harness assembly 10 may be positioned above the animal, such as dog D. Next, opening handles 29 may be pinched or forced together to provide counter force against rotational force Rf applied against hinge coupler 25, which additionally forces or separates normally closed first finger 21 from second finger 22 of pivotable frame 20 in the direction of open O, shown in FIG. 4, to enable an animal torso to be positioned therein torso opening 50A. In addition, first finger 21 and second finger 22 of pivotable frame 20, and first breast strap 31 and second breast strap 32 are configured to create a gap or opening, such as head opening 50B where a user of harness assembly 10 may pass through an animal's head, such as dog D. Next, harness assembly 10 may be lowered Lo over animal's head H and torso T, such as dog D.

It is preferably recognized herein that spring 27 may maintain pivotable frame 20 in a normally open position—via reversed action of spring 27 wherein to close C harness assembly 10 a user may squeeze opening handles 29 together to close first finger 21 and second finger 22, as shown in FIG. 3.

Figure 6:
FIG. 6 is a side perspective view of the animal harness assembly of FIG. 1, shown positioned on the animal.
Figure 7:
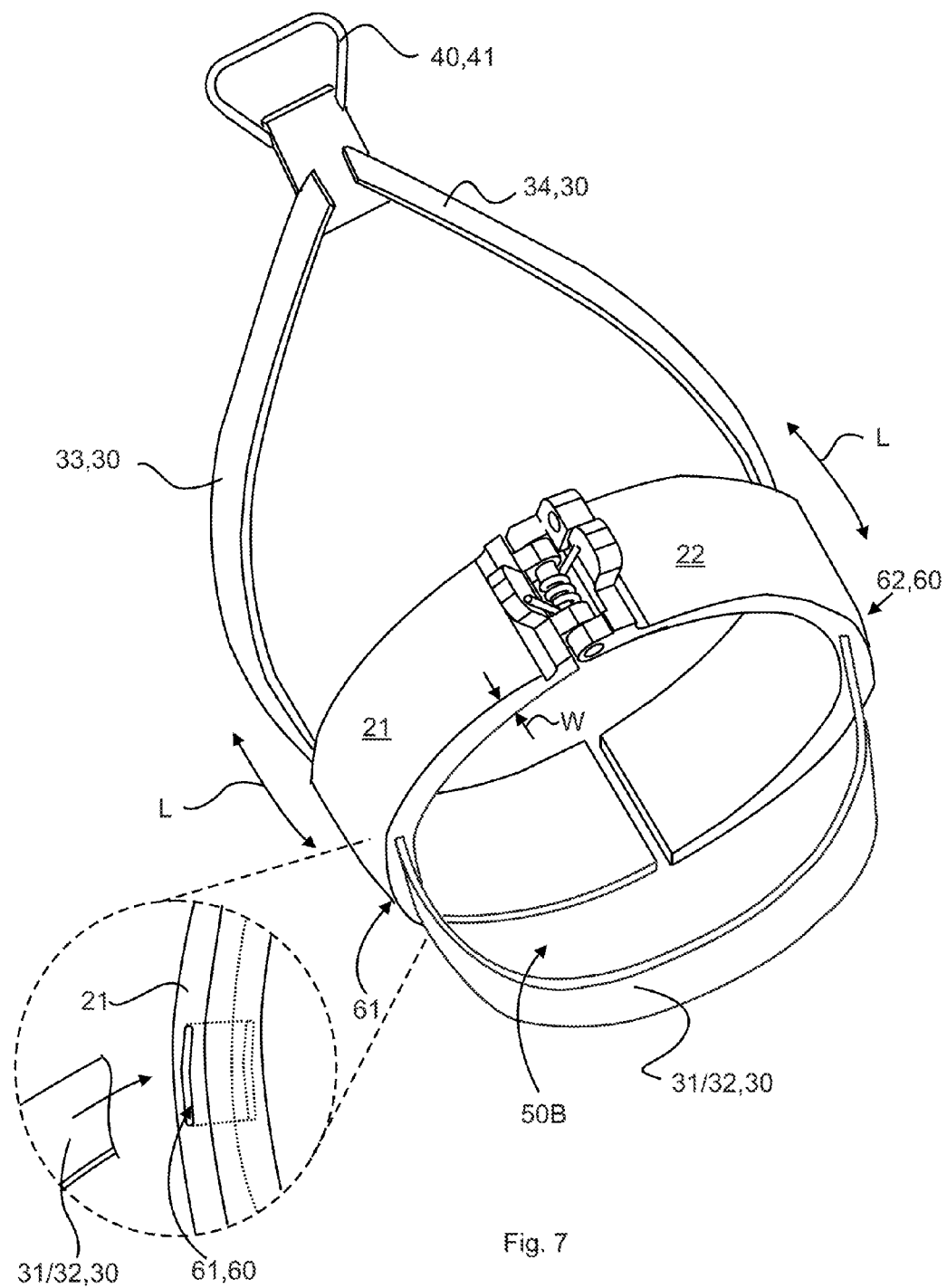
FIG. 7 is a top front facing perspective view of an alternate embodiment of the animal harness assembly of FIG. 1, shown with a free sliding self-adjusting harness strap(s)

Referring to FIG. 6, by way of example, and not limitation, there is illustrated a side perspective view of harness assembly 10 affixed to leash Le, shown positioned on dog D. In use, the head H of dog D is slipped through or positioned therethrough head opening 50B between first finger and second finger 22 of pivotable frame 20, and first breast strap 31 and second breast strap 32. Next, harness assembly 10 is preferably positioned over or lowered Lo over the back Bk or torso T of dog D. Next, opening handles 29 may be released and rotational force Rf from spring 27 may be applied against hinge coupler 25, which rotational force Rf brings together first finger 21 to second finger 22 of pivotable frame 20 in the direction of closed C to enable an animal to be securely held in torso opening 50A and first finger 21 to second finger 22 of pivotable frame 20 is preferably closed, gripped or encircled around torso T of dog D securing dog D therein harness assembly 10.

Referring again to FIG. 6, by way of example, and not limitation, there is illustrated a side perspective view of harness assembly 10, shown with dog D secured therein harness assembly 10 with torso T of dog D enclosed, gripped or encircled by first finger 21 and second finger 22 of pivotable frame 20 and one or more breast straps 31/32, such as first breast strap 31 and second breast strap 32 secured against the chest or breast B of dog D to enable dog D to be securely held therein harness assembly 10.

It is contemplated herein that harness assembly 10 may be stored with leash Le attached ready for quick one hand installation.

It is further contemplated herein that harness assembly 10 may vary in configuration, size and adjustment to accommodate different sized head H, back Bk, torso T of dog D.

Figure 5:
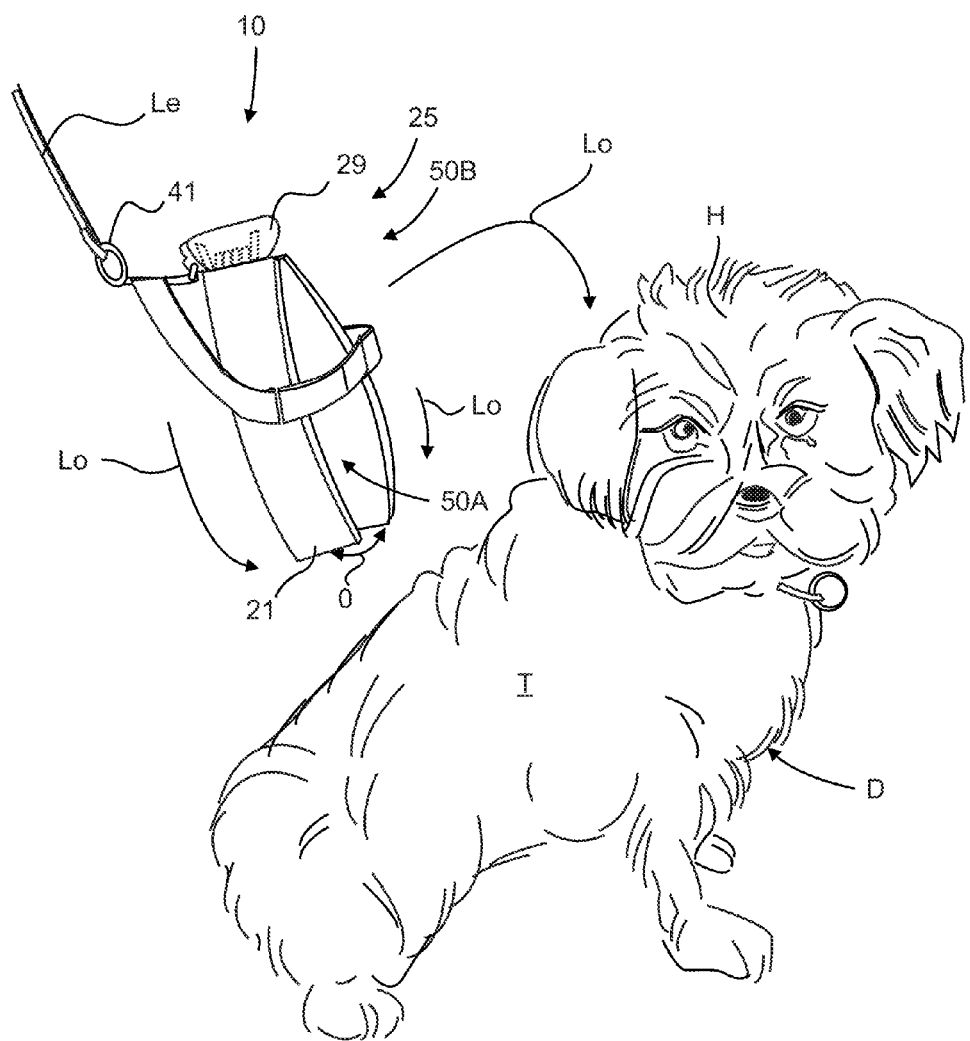
FIG. 5 is a side perspective of the animal harness assembly of FIG. 1 positioned above the animal showing placement before installation.

Referring again to FIG. 7, by way of example, and not limitation, there is illustrated a top front facing perspective view of another example embodiment harness assembly 10A, shown with a free sliding self-adjusting harness strap (s) 30. Preferably first finger 21 and second finger 22 of pivotable frame 20 may each include one or more passageways, such as conduit(s) 60, which may include first conduit 61 formed therein or therethrough or positioned therein or disposed thereon first finger 21 of pivotable frame 20 and second conduit 62 formed therein or therethrough or positioned therein or disposed thereon second finger 22 of pivotable frame 20. Preferably one or more breast straps 31/32 and one or more torso straps 33/34 or single harness strap(s) 30, being a combination strap of harness straps 30 (one or more breast straps 31/32 and one or more torso straps 33/34), may be positioned therethrough conduit(s) 60, such as first conduit 61 and second conduit 62 to form a loop around pivotable frame 20 and further configured to enable length longitudinal adjustment L directional movement or adjustment of harness strap(s) 30 relative to or proximately transverse to first finger 21 and second finger 22 of pivotable frame 20. In use, harness assembly 10A may be adjusted by sliding or pushing one or more breast straps 31/32 in a forward direction (longitudinal adjustment L) of pivotable frame 20 via conduit 60, thus increasing or to make larger the size of head opening 50B (the space between first finger 21 and second finger 22 of pivotable frame 20, and breast straps 31/32) to enable a larger or enlarged head opening 50B to simplify lasso or capture of the head H of dog D, as shown in FIGS. 5 and 6. Moreover, after installation of harness assembly 10A, first finger 21 and second finger 22 of pivotable frame 20, thereon dog D a tug of leash ring 40 pulls harness strap(s) 30 in a rearward direction (longitudinal adjustment L) of pivotable frame 20 via conduit 60, thus decreasing, to make smaller, or shrinking the size of head opening 50B (the space between first finger 21 and second finger 22 of pivotable frame 20, and breast straps 31/32) to secure breast straps 31/32 against breast B of dog D to restrain dog D therein harness assembly 10A.

It is recognized herein that conduit(s) 60 may be formed cross-wise, longitudinal L, within the width W of first finger 21 and/or second finger 22 or conduit(s) 60 may be formed within nodule or housing formed as part of finger 21 and/or second finger 22.

It is contemplated herein that pivotable frame 20 may include one or more passageways, such as conduit(s) 60, which may include first conduit 61 positioned therein or disposed thereon pivotable frame 20 or may include first conduit 61 and second conduit 62 positioned therein or disposed thereon first finger 21 of pivotable frame 20 and one or more breast straps 31/32 may be moved in a direction (longitudinal adjustment L).

It is further contemplated herein that pivotable frame 20 may include one or more passageways, such as conduit(s) 60, which may include first conduit 61 positioned therein or disposed thereon pivotable frame 20 and one or more breast straps 31/32 may be moved in a direction (longitudinal adjustment L).

It is still further contemplated herein that breast strap 31/32 may be configured as single breast strap disposed between first finger 21 and second finger 22 of pivotable frame 20, may be configured as a loop or lasso disposed therefrom first finger 21 or second finger 22 of pivotable frame 20.

Referring again to FIGS. 8A and 8B, by way of example, and not limitation, there is illustrated a top front facing perspective view of another example embodiment harness assembly 10B, with a lock, lock device, such as locking mechanism 70. Preferably locking mechanism 70 may be positioned between back side 29A.1 of first opening handle 29A and back side 29B.1 of second opening handle 29B, respectively. In this example embodiment locking mechanism 70 may include pivot arm or bar device, such as D-ring 72 having first end 72.1 and second end 72.2. Preferably first end 72.1 may be pivotally or hinge 73 mounted thereto back side 29A.1 of first opening handle 29A and pivot or hinge between an unlocked and locked position of pivotable frame 20. Moreover, back side 29B.1 of second opening handle 29B or second end 72.2 may include a bump, or receptacle, such as latch 74 to releasably receive and latch second end 72.2 of D-ring 72. In use, as shown in FIG. 6, once dog D is preferably secured therein harness assembly 10 with torso T of dog D enclosed, gripped or encircled by first finger 21 and second finger 22 of pivotable frame 20, locking mechanism 70 may be engaged by pivoting second end 72.2 of D-ring 72 about hinge 73 until second end 72.2 of D-ring 72 engages latch 74, and latches locking mechanism 70 in a locked and closed position so first finger 21 and second finger 22 of pivotable frame 20 remain securely closed around torso T of dog D.

Figure 9:
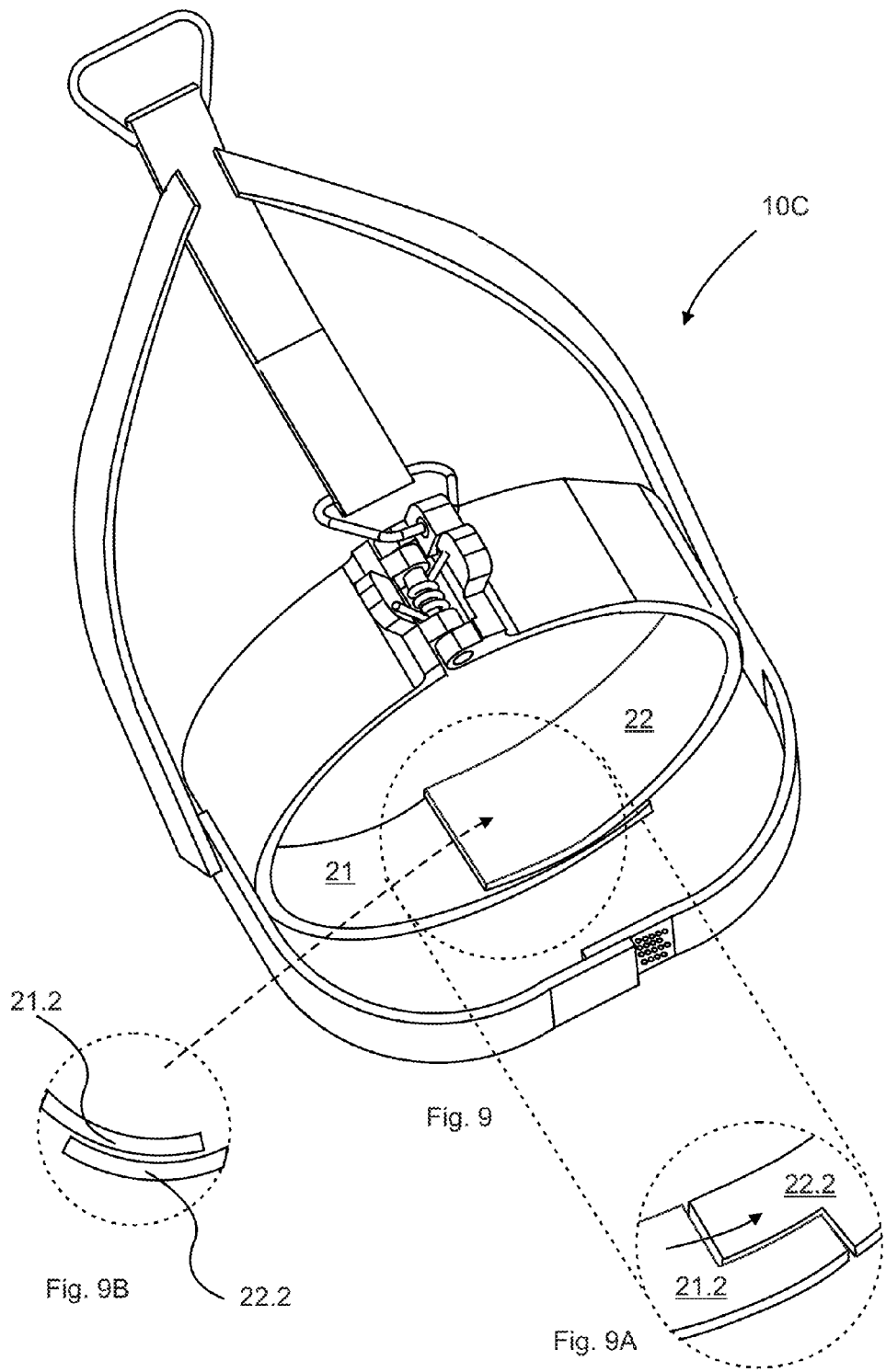
FIG. 9 is a top front facing perspective view of an alternate embodiment of the animal harness assembly of FIG. 1, shown with overlapping size adjustable fingers.
Figure 10:
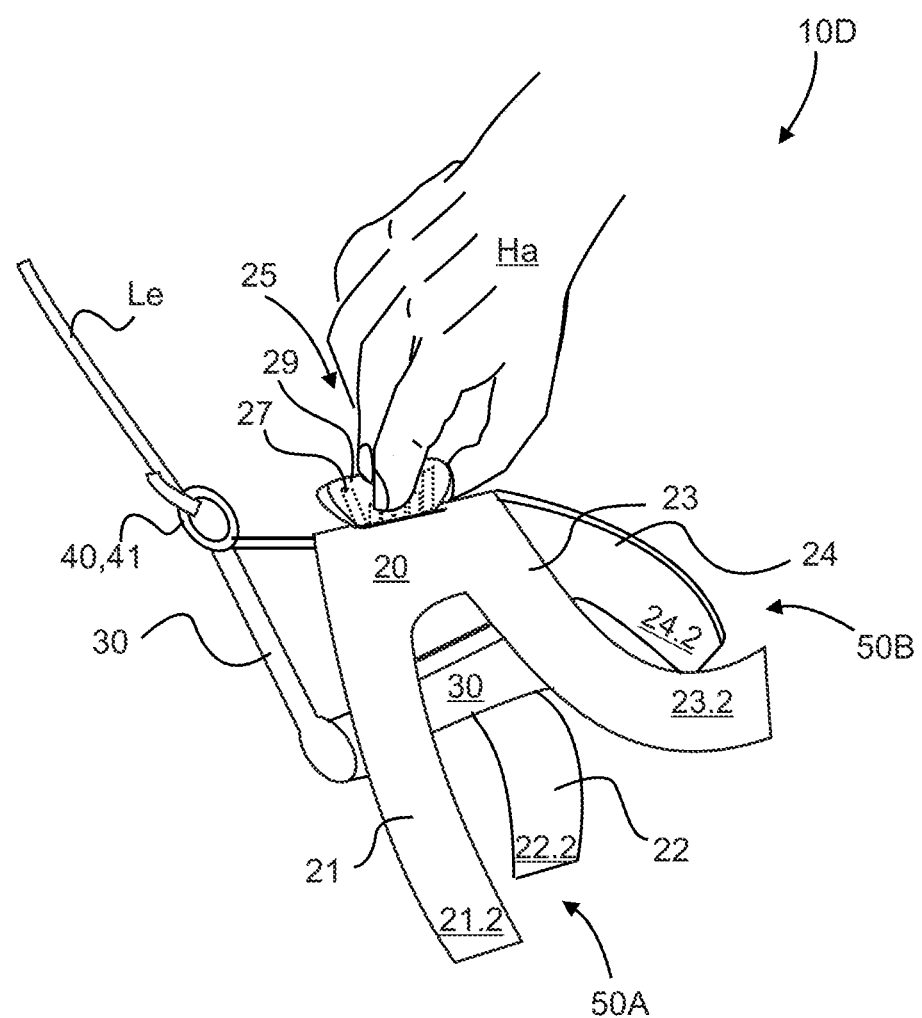
FIG. 10 is a side perspective view of an exemplary embodiment of the harness assembly of FIG. 1, shown with opening handles being pinched by a hand.
Figure 11:
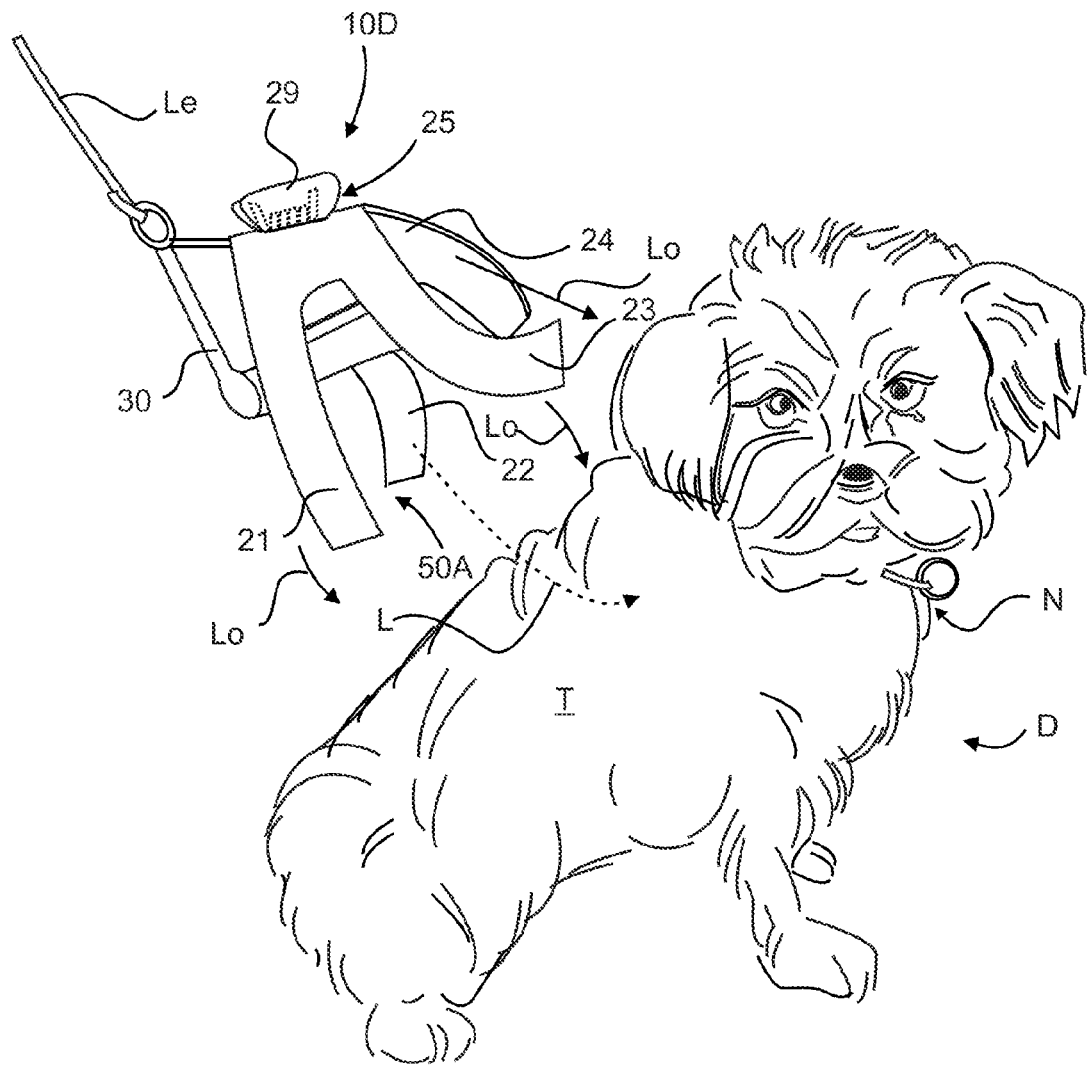
FIG. 11 is a side perspective of the animal harness assembly of FIG. 10 positioned above the animal showing placement before installation.

Referring again to FIG. 9, 9A, 9B by way of example, and not limitation, there is illustrated a top or side front facing perspective view of another example embodiment harness assembly 10C, with first finger 21 and second finger 22 overlapped or overlap one another to accommodate different sized animals and to automatically expand to accommodate animal growth. It is contemplated herein that first finger 21 and second finger 22 of pivotable frame 20 may be overlapping, interlocking, latchable via hook and loop, snap, button, clasp, buckle, magnetic device, or the like. It is recognized herein that expansion device 36 may accommodate size differences and/or volume of to accommodate different sized head H, back Bk, torso T of dog D, as shown in FIG. 9.

Referring again to FIG. 10, by way of example, and not limitation, there is illustrated a side perspective view of another example embodiment harness assembly 10D, shown with opening handles 29 being pinched by hand Ha. Preferably pivotable frame 20 includes two sets of elongated arms or saddle members to encircle an animal's body or torso therein, such as first set of fingers, including first finger 21 and second finger 22, second set of first finger 21 and second finger 22, labeled as third finger 23 and fourth finger 24 hinged thereabout hinge coupler 25. First finger 21 and second finger 22, and third finger 23 and fourth finger 24 may be configured in an arcing or curved configuration whereby when rotated thereabout hinge coupler 25 this facilitates rotational opening of both first finger 21 and second finger 22, and third finger 23 and fourth finger 24 of pivotable frame 20 to then encompass an animal's body or torso and rotational closure of first finger 21 and second finger 22, and third finger 23 and fourth finger 24 of pivotable frame 20 to grip or enclose an animal's body or torso.

It is contemplated that spring 27 rotational force Rf applied against hinge coupler 25 may additionally force or bring second end 21.2 of first finger 21 and second end 22.2 of second finger 22 together, and second end 23.2 of third finger 23 and second end 24.2 of fourth finger 24 together and/or in contact with one another, respectively.

It is contemplated that spring 27 rotational force Rf applied against hinge coupler 25 may additionally force or bring second end 21.2 of first finger 21 and second end 22.2 of second finger 22 together, and second end 23.2 of third finger 23 and second end 24.2 of fourth finger 24 together and/or in contact with one another, respectively.

It is still further contemplated that harness assembly 10D may include overlapping first finger 21 and second finger 22, as shown in FIG. 9, and overlapping third finger 23 and fourth finger 24 to accommodate different sized animals and expand to accommodate animal growth. It is contemplated herein that first finger 21 and second finger 22, and third finger 23 and fourth finger 24 of pivotable frame 20 may be overlapping, interlocking, latchable via hook and loop, snap, button, clasp, buckle, magnetic device, or other attachment device 36 or the like.

Referring again to FIG. 11, by way of example, and not limitation, there is illustrated a side perspective view of another example embodiment harness assembly 10D affixed to leash Le. Preferably, in use, harness assembly 10D may be positioned above the animal, such as dog D. Next, opening handles 29 may be pinched or forced together to provide counter force against rotational force Rf applied against hinge coupler 25, which additionally forces or separates first finger 21 from second finger 22, and third finger 23 from fourth finger 24 of pivotable frame 20 in the direction of open O, similar to that shown in FIG. 4, to enable an animal to be positioned in torso opening 50A and neck or head opening 50B.

Figure 12:
FIG. 12 is a side perspective view of the animal harness assembly of FIG. 10, shown positioned on the animal.

Referring to FIG. 12, by way of example, and not limitation, there is illustrated a side perspective view of another example embodiment harness assembly 10D affixed to leash Le, shown positioned on dog D. Next, harness assembly 10D is preferably lowered Lo over the neck H, back Bk, torso T of dog D. Next, opening handles 29 may be released and rotational force Rf from spring 27 may be applied against hinge coupler 25, which rotational force Rf brings together first finger 21 to second finger 22, and third finger 23 from fourth finger 24 of pivotable frame 20 in the direction of closed C to enable an animal, such as dog D to be securely held or restrained therein in torso opening 50A and head opening 50B.

Referring again to FIG. 12, by way of example, and not limitation, there is illustrated a side perspective view of harness assembly 10D, shown with dog D secured therein harness assembly 10D with neck or head H, back Bk, torso T of dog D enclosed, gripped or encircled by first finger 21 and second finger 22, and third finger 23 from fourth finger 24 of pivotable frame 20 and preferably closed, gripped or encircled by first finger 21 to second finger 22, and third finger 23 from fourth finger 24 of pivotable frame 20 to enable dog D to be securely held or restrained therein harness assembly 10D.

It is contemplated herein that harness assembly 10 may be stored with leash Le attached ready for quick one hand installation.

It is further contemplated herein that harness assembly 10 may vary in configuration, size and adjustment to accommodate different sized head H, back Bk, torso T of dog D.

It is still further contemplated that spring 27 rotational force Rf applied against hinge coupler 25 may additionally force or bring second end 21.2 of first finger 21 and second end 22.2 of second finger 22 in close proximity, and second end 23.2 of third finger 23 and second end 24.2 of fourth finger 24 in close proximity, respectively.

Figure 13:
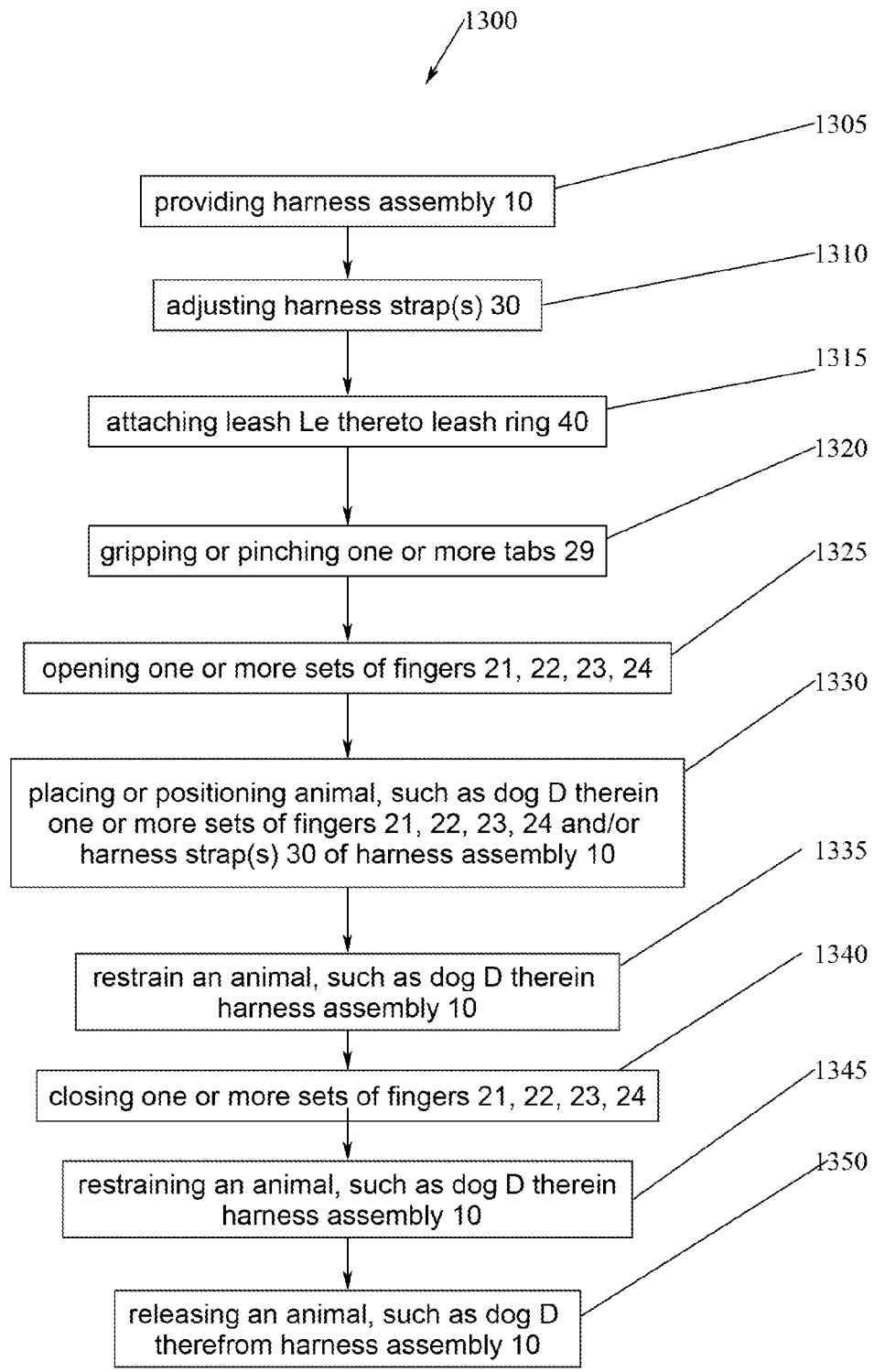
FIG. 13 is a flow diagram of a method of restraining an animal utilizing animal harness assembly of FIGS. 1-12.

Referring now to FIG. 13, there is illustrated a flow diagram 1300 of a method of one handed animal harness installation utilizing harness assembly 10 as described herein in FIGS. 1-12. In block or step 1305, providing harness assembly 10/10A/10B/10C/10D, collectively 10, as described herein in FIGS. 1-12. In block or step 1310, adjusting harness strap(s) 30 of harness assembly 10 to accommodate an animal, such as dog D. In block or step 1315, attaching leash Le thereto leash ring 40. In block or step 1320, gripping or pinching or applying a force against one or more opening handles 29. In block or step 1325, opening one or more sets of fingers 21, 22, 23, 24, or spreading or applying counter force against rotational force Rf applied against hinge coupler 25, with sufficient pressure to overcome spring 27 spring force to separate, one or more sets of fingers 21, 22, 23, 24 open, as an open harness assembly 10 ready to receive an animal, such as dog D. In block or step 1330, placing or positioning animal, such as dog D therein one or more sets of fingers 21, 22, 23, 24 and/or harness strap(s) 30 of harness assembly 10. In block or step 1335, releasing grip thereof of one or more opening handles 29. In block or step 1340, closing one or more sets of fingers 21, 22, 23, 24 or releasing rotational force Rf applied against hinge coupler 25 to bring one or more sets of fingers 21, 22, 23, 24 closed, as a closed harness assembly 10. In block or step 1345, restraining an animal, such as dog D therein harness assembly 10. In block or step 1350, releasing an animal, such as dog D therefrom harness assembly 10.

The foregoing description and drawings comprise illustrative embodiments of the present invention. Having thus described exemplary embodiments, it should be noted by those ordinarily skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one ordinarily skilled in the art to which this invention pertains having the benefit of the teachings presented in the foregoing descriptions and the associated drawings. Although specific terms may be employed herein, they are used in a generic and descriptive sense only and not for purposes of limitation. Moreover, the present invention has been described in detail; it should be understood that various changes, substitutions and alterations can be made thereto without departing from the spirit and scope of the invention as defined by the appended claims. Accordingly, the present invention is not limited to the specific embodiments illustrated herein, but is limited only by the following claims.

What is claimed is:

1. A harness to releasably restrain an animal, the harness comprising:
   a pivotable frame, said pivotable frame having a first hinge coupler and a second hinge coupler configured to removeably affix said first hinge coupler and said second hinge coupler together, said first hinge coupler is configured having a first finger and a first opening handle and said second hinge coupler configured having a second finger and a second opening handle, wherein said first finger is formed having at least a first conduit and said second finger is formed having at least a second conduit;
   a pin to rotationally connect said first hinge coupler and said second hinge coupler;
   a spring positioned between each of said first hinge coupler and said second hinge coupler, said spring biases said first finger and said second finger together; and
   at least one harness comprising a breast strap and a torso strap in combination, wherein said at least one harness passes through said first conduit and said second conduit, wherein said at least one harness slidably adjusts therethrough said first conduit and said second conduit.

2. The harness of claim 1, wherein said first hinge coupler is configured offset from said second hinge coupler.

3. The harness of claim 2, wherein said first hinge coupler is positioned in-line with said second hinge coupler to receive said pin therein said hinge coupler.

4. The harness of claim 3, wherein said spring is wrapped therearound said pin.

5. The harness of claim 1, wherein said first opening handle and said second opening handle are configured as a first finger tab and a second finger tab.

6. The harness of claim 1, wherein said at least one harness further comprises a leash ring affixed thereto.

7. The harness of claim 1, wherein said at least one harness further comprises a breast strap.

8. The harness of claim 1, wherein said at least one harness further comprises a torso strap.

9. The harness of claim 1, wherein said torso strap further comprises a leash ring affixed thereto.

10. The harness of claim 1, wherein said at least one harness slidably adjust therethrough at least one of said first conduit and said second conduit.

11. The harness of claim 1, wherein said pivotable frame includes a locking mechanism.

12. The harness of claim 11, wherein said locking mechanism is positioned between said first hinge coupler and said second hinge coupler.

13. The harness of claim 1, wherein said said first finger and said second finger are configured to overlap one another.

14. The harness of claim 1, further comprises a clasp positioned between said first finger and said second finger.

15. The harness of claim 1, wherein said at least one harness is configured to be removeably affixed to said first finger and said second finger.

16. The harness of claim 1, wherein said first conduit and said second conduit are configured to enable a longitudinal adjustment between said breast strap and said torso strap in combination.

17. A method of restraining an animal, said method comprising the steps of:
   providing a harness having a pivotable frame, said pivotable frame having a first hinge coupler and a second hinge coupler configured to removeably affix said first hinge coupler and said second hinge coupler together, said first hinge coupler is configured having a first finger and a first opening handle and said second hinge coupler configured having a second finger and a second opening handle, wherein said first finger is formed having at least a first conduit and said second finger is formed having at least a second conduit, a pin to rotationally connect said first hinge coupler and said second hinge coupler, a spring positioned between each of said first hinge coupler and said second hinge coupler, said spring biases said first finger and said second finger together, at least one harness comprising a breast strap and a torso strap, said at least one harness passes through said first conduit and said second conduit, wherein said at least one harness slidably adjusts therethrough said first conduit and said second conduit, wherein said at least one harness is configured having a leash ring affixed thereto;
   gripping said first opening handle and said second opening handle;
   opening said first finger and said second finger;
   positioning the animal between said first finger and said second finger;
   releasing grip on said first opening handle and said second opening handle;
   closing said first finger and said second finger;
   attaching a leash thereto said leash ring; and
   restraining the animal therein said harness.

18. The method of claim 17, further comprising the step of adjusting said at least one harness to accommodate the animal.

* * * * *